Nov. 24, 1959 D. FRASER 2,914,755
ICING DETECTOR
Filed May 24, 1956
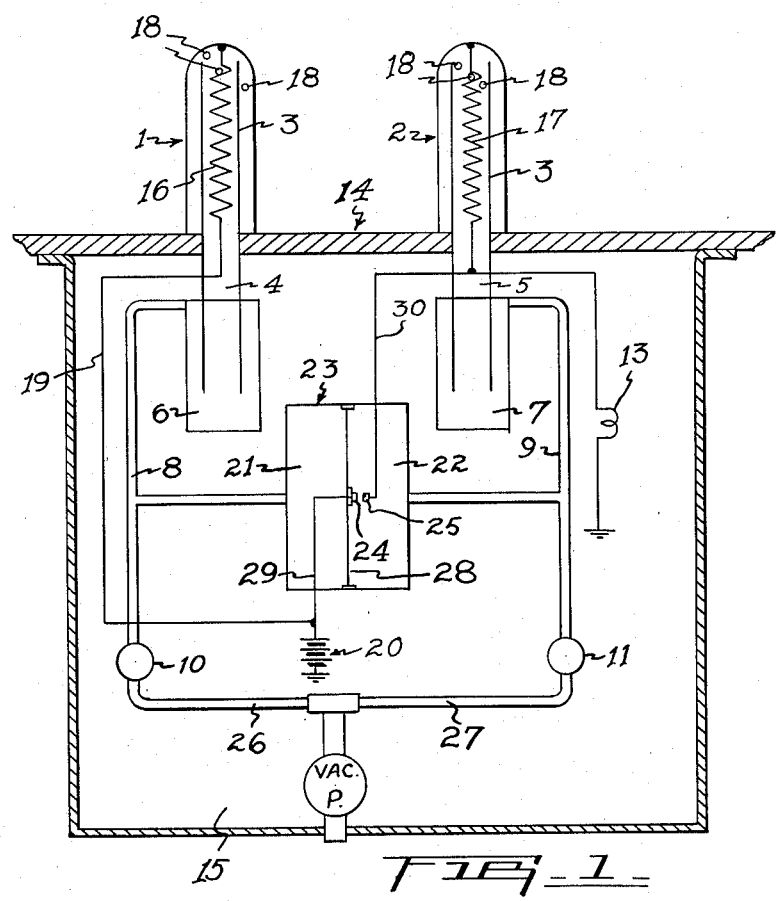
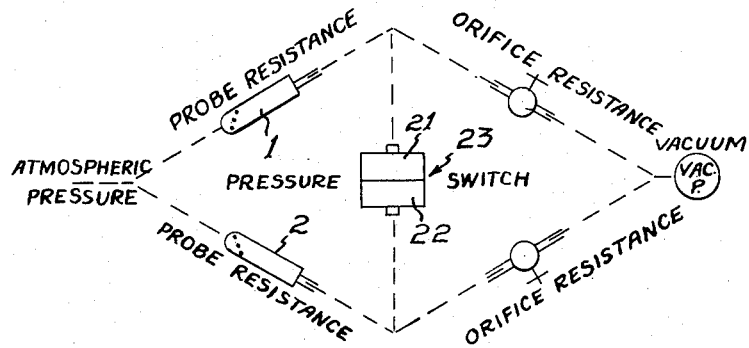
INVENTOR
DONALD FRASER
By—Smart+Biggar
ATTORNEYS

# United States Patent Office 2,914,755
Patented Nov. 24, 1959

2,914,755
ICING DETECTOR

Donald Fraser, Ottawa, Ontario, Canada; Gladys Clayton Fraser, executrix of the estate of said Donald Fraser, deceased, assignor to National Research Council, Ottawa, Ontario, Canada, a body corporate Application May 24, 1956, Serial No. 587,041
6 Claims. (Cl. 340—234)

This invention relates to orifice-type icing detectors which can be used for both stationary and moving installations, such as aircraft (including helicopters), ships and ground installations. Such detectors can be used for indicating, for example by a pilot light, the existence of icing conditions and also for the automatic actuation of icing protection of the exposed areas in respect of which the icing detector indicates the presence of icing conditions.

Existing orifice-type icing detectors for aircraft use generally consist of three basic components. The first is a detector probe exposed to the airstream, with a number of forward-facing and rearward-facing holes. The configuration of the probe, and its orientation, is such that when the front holes are open the pressure in the probe has a high value consisting of the local static pressure plus a proportion of the dynamic pressure in the airstream. When the front holes are blocked by ice, the pressure in the probe has a low value consisting of the static pressure minus a proportion of the dynamic pressure. This pressure differential is caused by the fact that, when the front holes are blocked by ice, the dynamic pressure component can affect the pressure inside the probe only by means of the rearward-facing holes so that the dynamic pressure will contribute only a negative component and will therefore tend to reduce the pressure inside the detector probe.

The second element is a reference pressure source which may be a similar probe or a flush static vent, the pressure from which is arranged to be always between the high and low values of the pressures in the detector probe. The pressure indicated by such a reference pressure source must of course be kept substantially independent of the effect of the icing conditions for example, by heating the probe or static vent or by placing them in a protected position so that adequate pressure differentials are developed between the detector probe and the reference pressure source when icing conditions affect the detector probe.

The third element of known orifice-type icing detectors is a diaphragm switch connected between the detector probe and the reference pressure source. This diaphragm switch is so arranged that when the detector probe pressure is higher than or equal to the reference pressure, the switch contacts remain open. When the detector probe pressure is less than the reference pressure by a given small amount, which occurs when icing conditions affect the detector probe, the switch contacts close and energize an icing warning light and also apply electrical de-icing power to the detector probe itself so that the latter will have further usefulness and indicate the extent to which main icing protection is required.

As will be apparent from the description of known orifice-type icing detectors, there are a number of conditions that must be satisfied before proper operation can be obtained. Firstly, the direction of the airstream over the probe must not vary by more than a certain amount (say plus or minus 30° about the vertical axis of the probe for a typical detector probe) in order that the correct positive and negative dynamic pressures be achieved, and also to ensure that ice is deposited on the front holes. This condition must be satisfied because the operation of the detector depends on the difference in pressure in the detector probe between no ice conditions when there is a positive component of dynamic pressure, and icing conditions when the forward-facing holes are closed off and there is negative component of dynamic pressure affecting the detector probe. The condition also means that for a given position and orientation of the detector probe, the airstream must be within relatively narrow directional limits if the icing detector is to operate satisfactorily.

Secondly, the speed of the airstream must be great enough in order to secure the deposit of ice on the front of the probe and to achieve the necessary amount of negative dynamic pressure to operate the pressure switch. It will be obvious that as the speed of the airstream falls a point will be reached at which the drop in pressure inside the detector probe caused by icing of the forward facing holes will be insufficient to actuate the pressure switch.

When such an orifice type icing detector is installed on an aeroplane or in a turbine-engine intake duct, these conditions are, in general, obtainable during flight or during running of the engine. However, for any installation in which the direction of the airstream with respect to the detector probe is unpredictable, such existing orifice-type icing detectors are of little use since as discussed above, their effective operation depends on a certain minimum velocity of airstream impinging upon the detector probe from a relatively constant direction. Existing orifice-type icing detectors are therefore of limited use in indicating icing conditions on board ships, airships, helicopters or for ground installations, for in all such cases the airstream may impinge upon the detector probe from anyone of many possible directions and at speeds varying from zero to perhaps 200 miles per hour.

An object of the invention is to overcome a number of the disadvantages of prior icing detectors, particularly those requiring the airstream to be of a substantial velocity and to impinge on the detector probe at a relatively constant angle.

A further object of the invention is to provide an icing detector of greater overall sensitivity.

These and other objects are achieved according to the invention by using two similar probes, mounted adjacent to each other, one probe acting as the detector probe, and the other as the reference pressure probe, and connecting a source of vacuum to each of the probes through pneumatic resistance elements, thereby drawing air in through the probe orifices, the lowering of pressure inside the detector probe caused by ice formation adjacent to its orifices being sufficient to actuate a pressure switch whose respective pressure chambers are connected to the reference and detector probes. By using this arrangement, dependence upon ambient air velocities to build up pressures inside the probes is avoided, and with it any limitations on the directions from which such air velocities must impinge upon the probes.

An important advantage of this invention is that by using a suction device to draw air in through the orifices in the probes, an air flow is made available to deposit ice at the orifices of the detector probe, independent of the amount or direction of the ambient air flow in the region of the probes.

A further advantage is that by using two similar probes, and mounting them adjacent to each other in a fashion to subject them both to the same ambient air velocities, any such ambient air velocities will affect the pressures in each probe equally, and therefore will not upset the balance of pressures.

A still further advantage is that the pressures required to operate the pressure-switch are generated by the source of vacuum, and are thus not dependent on the dynamic pressures generated by an external air stream.

A still further advantage arises from the increased sensitivity obtainable from the present invention as compared with prior icing detector arrangement.

The above and other objects and features of the invention will appear from the following description with reference to the attached drawings wherein like numerals of reference refer to the same or similar parts in the several figures.

Figure 1 is a pneumatic pressure circuit diagram showing the various elements of my invention and the connections therebetween; and Figure 2 is a schematic diagram designed to emphasize the pneumatic bridge circuit feature of my invention.

In Figure 1, 14 indicates a surface exposed to the atmosphere in respect of which information as to icing conditions is required. Projecting outwardly from surface 14 are reference probe 1 and detector probe 2 which can be of conventional design such as has been used previously in pressure operated icing detector arrangements. In the drawings a preferred form of detector probe is used. This is provided with baffles 3 to assist in the formation of ice blocks across the orifices 18 under all kinds of icing conditions. The construction of this probe is shown in detail in co-pending United States application Serial No. 348,243, filed April 13 1953 and this type of detector probe has been found particularly advantageous when applied to the present invention. It will also be noted that, because air is drawn in through the probe orifices, thereby eliminating dependence upon ambient air velocities in order to develop dynamic pressures inside the probes, the probe orifices, as distinct from prior pressure operated icing detectors, may be distributed evenly around the periphery of the probe and indeed it is advantageous so to do. Further information as to the design and operation of detector and reference probes may be found in three publications of the National Aeronautical Establishment of Canada as follows: Laboratory Report LR-3 of July 1951, "Orifice-Type Ice Detector, Preliminary Icing Tunnel Tests of Functioning as Ice Detector, Rate-of-Icing Meter, and Icing-Severity Meter" (by D. Fraser); Laboratory Report LR-71 of June 1953, "The Characteristics of an Orifice-Type Icing-Detector Probe" (by D. Fraser); and Laboratory Report LR-129 of April 1955, "Reference Pressure Probes for an Orifice-Type Icing Detector" (by D. Fraser and D. C. Baxter).

Associated with reference probe 1 and detector probe 2 are heater elements 16 and 17 respectively. These may be inside the probes or may be mounted on the outside surface so long as they do not interfere with the flow of air in through the probe orifices. One terminal of both heaters is grounded as shown and the other terminal of heater 16 inside reference probe 1 is connected, by means of conductor 19, to one terminal of battery 20, the other terminal being grounded as shown. With this arrangement heater 16 is continuously supplied with current so that it keeps orifices 18 of reference probe 1 free from ice at all times.

Pneumatic conduits 4 and 5 connect probes 1 and 2 respectively to the other parts of the pneumatic circuit which are contained within compartment 15 which is warmed where necessary to keep it above freezing temperature and which, for convenience of illustration, has been shown as immediately under surface 14. In the embodiment shown in the drawings, conduits 4 and 5 lead to water traps 6 and 7 respectively which are designed to prevent water caused by the melting of the ice from penetrating the remaining parts of the pneumatic circuit. A further pneumatic conduit 8 connects water trap 6 to a pneumatic resistance element, shown as adjustable orifice 10, and also to pressure chamber 21 of pressure switch 23. Similarly, pneumatic conduit 9 connects water trap 7 to adjustable orifice 11 and to chamber 22 of pressure switch 23. The other sides of both adjustable orifices 10 and 11 are each connected to vacuum source 12 by means of conduits 26 and 27 as shown. Adjustable orifices 10 and 11 and vacuum source 12 are well known conventional components such as those used in aircraft instrumentation systems.

Pressure switch 23 is also of conventional design and includes a diaphragm 28, two pressure chambers 21 and 22 and electrical contacts such as those shown at 24 and 25 which form a closed connection when the pressure in chamber 22 falls below that in chamber 21 by a predetermined amount. As explained above, the reference probe is pneumatically connected to pressure chamber 21 by means of conduits 4, 8 and water trap 6. Detector probe 2 is connected to chamber 22 by means of conduits 5, 9 and water trap 7. While it is possible to use a pressure switch having a linear characteristic so that the contacts both "make" and "break" at substantially the same predetermined value of pressure difference between the chambers, it has been found advantageous to utilize a pressure switch having a hysteresis characteristic so that the pressure difference required to cause the electrical contacts to come together is greater than the pressure difference required to keep them in that position and, therefore, greater than the pressure difference defining the point at which they again open the circuit.

Switch contact 24 is connected by means of conductor 29 to the above-ground terminal of battery 20. Switch contact 25 is connected, by means of conductor 30, to heater 17 in detector probe 2 and is also connected by means of conductor 31 to indicating device 13, the other side of which is grounded as shown.

Under non-icing conditions all orifices will be free of obstruction and air is sucked in through both probes. Adjustable orifices 10 and 11 are set to give equal pressures in chambers 21 and 22 of pressure switch 23 or to give in chamber 22 a pressure higher than that in chamber 21. Any water sucked in, in the form of cloud or rain, is caught in the water traps 6 and 7 or, alternatively, sucked right through the system and exhausted at the vacuum source. As discussed above, when the pressure in chamber 22 is equal to or greater than that in chamber 21, the switch contacts remain open so that neither heater 17 nor indicating device 13 is energized. Moreover, because the probes are similar and mounted adjacent to each other, any ambient air velocity over the probes will affect each probe equally and will therefore not upset the balance of pressures in chambers 21 and 22.

When icing conditions exist and there is no ambient air velocity, the icing cloud will be sucked in through the orifices and ice will be formed as a frosty deposit around the orifices and on the baffles of the as yet unheated detector probe, thereby choking off the orifices. When there is some ambient air velocity, the same result will follow since ice will be deposited in the normal way on the upstream side of the cold detector probe. The reference probe, being of course continuously heated as described above, will have no formation of ice upon it. In these circumstances, the ice formation of detector probe 2 will cause a lowering of the pressure inside the probe. This substantially lowers the pressure in the detector probe side of the pneumatic circuit and hence also lowers the pressure applied to chamber 22 of switch 23, causing contacts 24 and 25 to engage so as to supply current to both heater 17 and indicating device 13. It may also be convenient to insert in series with indicating device 13 a relay which would actuate main de-icing equipment on the surfaces in respect of which detector probe 1 indicates icing conditions.

After a period of time sufficient for heater 17 to at least partially de-ice detector probe 2, the pressure inside detector probe 2 will begin to rise and will reach a point sufficiently high that the difference in pressure between the two chambers in switch 23 is insufficient to hold the contacts together and they will accordingly break. This restores the device to its original operating condition, with neither indicating device 13 nor heater 17 connected to a source of current so that the detector probe 2 is again available as an indicator of icing conditions.

Figure 2 provides a convenient schematic representation of the invention. It is there represented as a pneumatic bridge circuit wherein the air from the atmosphere flows in through the probe orifices into the respective branches of the bridge circuit, through the pneumatic conduits and adjustable orifices to the vacuum source and hence back out to the atmosphere. The pressure switch 23 has its chambers 21 and 22 connected to the mid-points of the respective arms and acts as a balance indicator. Under non-icing conditions, the air intake by both the reference and detector probe will be substantially the same so that the pressure at the centre point of both arms will be approximately equal. When, however, ice formation closes off the orifices in detector probe 2, this circumstance, together with the action of adjustable orifice 11, will cause the pressure at the centre point of the lower arm of the bridge to fall, thereby allowing the switch contacts of pressure switch 23 to close. The arrangement is thus analogous to an electrical Wheatstone bridge circuit, the energy for the bridge being provided by a vacuum source which causes air to be drawn in through the probe orifices, to pass through the respective arms of the bridge and then to discharge it out into the atmosphere again. The balance indicator is in the form of a pressure switch connected between the mid-points of the arms.

Because this form of icing detector does not rely on the presence of ambient air velocities for its operation, it is particularly useful for ground installations such as those associated with radar equipment, and installations mounted on ships or helicopters where icing protection is to be turned on automatically at the first onset of icing conditions.

What I claim as my invention is:

1. A device for detecting icing conditions comprising: a reference probe adapted to be heated so as to prevent ice formation thereon, a detector probe, said probes extending outwardly from the surface in respect of which information as to icing condition is required, a pneumatic connection between each of said probes and a vacuum source, said source adapted to cause air to be drawn in through each of said probes irrespective of the direction and magnitude of the air stream over said surface, a pneumatic resistance in said pneumatic connection, a pressure switch pneumatically connected to each of said probes, said pressure switch being adapted to actuate electrical contacts when the pressure in the detector probe falls below the pressure in the reference probe by a predetermined amount.

2. A device for detecting icing conditions as claimed in claim 1, comprising a heater adapted to heat the detector probe, and contacts adapted on actuation by the pressure switch to energize the heater.

3. A device for detecting icing conditions comprising a reference probe adapted to be heated so as to prevent ice formation thereon, a detector probe, a pressure switch, pneumatic resistance elements, and a vacuum source, the reference probe being pneumatically connected to one chamber of the pressure switch and also pneumatically connected through a pneumatic resistance element to the vacuum source, the detector probe being pneumatically connected to the other chamber of the pressure switch and also pneumatically connected through another pneumatic resistance element to the vacuum source, said source adapted to cause air to be drawn in through each of said probes irrespective of the direction and magnitude of the air stream over the surface in respect of which information as to icing conditions is required, said switch being adapted to actuate electrical contacts when the pressure in the detector probe falls below the pressure in the reference probe by a predetermined amount.

4. A device for detecting icing conditions comprising: a reference probe adapted to be heated so as to prevent ice formation thereon, a detector probe provided with a heating element, a pressure switch, pneumatic resistance elements, and a vacuum source, the reference probe being pneumatically connected to one chamber of the pressure switch and also pneumatically connected through a pneumatic resistance element to the vacuum source, the detector probe being pneumatically connected to the other chamber of the pressure switch and also pneumatically connected through another pneumatic resistance element to the vacuum source, said source adapted to cause air to be drawn in through each of said probes irrespective of the direction and magnitude of the air stream over the surface in respect of which information as to icing conditions is required, said switch being adapted to actuate electrical contacts when the pressure in the detector probe falls below the pressure in the reference probe by a predetermined amount, the actuation of said contacts actuating an indicating device and bringing into operation the heater in the detector probe so as to secure de-icing thereof.

5. A device for detecting icing conditions comprising: a reference probe adapted to be heated so as to prevent ice formation thereon, a detector probe, a pressure switch, adjustable orifice elements and a vacuum source, the reference probe being pneumatically connected to one chamber of the presure switch and also pneumatically connected through an adjustable orifice element to the vacuum source, the detector probe being pneumatically connected to the other chamber of the pressure switch and also pneumatically connected through another adjustable orifice element to the vacuum source, said source adapted to cause air to be drawn in through each of said probes irrespective of the direction and magnitude of the air stream over the surface in respect of which information as to icing conditions is required, said switch being adapted to actuate electrical contacts when the pressure in the detector probe falls below the pressure in the reference probe by a predetermined amount, the actuation of said contacts actuating an indicating device and bringing into operation the heater in the detector probe so as to secure de-icing thereof.

6. A device for detecting icing conditions comprising: a reference probe adapted to be heated so as to prevent ice formation thereon, a detector probe, a pressure switch having a hysterisis characteristic, adjustable orifice elements and a vacuum source, the reference probe being pneumatically connected to one chamber of the pressure switch and also pneumatically connected through an adjustable orifice element to the vacuum source, the detector probe being pneumatically connected to the other chamber of the pressure switch and also pneumatically connected through another adjustable orifice element to the vacuum source, said source adapted to cause air to be drawn in through each of said probes irrespective of the direction and magnitude of the air stream over the surface in respect of which information as to icing conditions is required, said switch being adapted to actuate said contacts when the pressure in the detector probe falls below that in the reference probe by a first predetermined amount, thereby actuating an indicating device and bringing into operation a heater which will de-ice the detector probe, said pressure switch also being adapted to open its contacts when the pressure in the detector probe rises to a value below that in the reference probe by a second predetermined amount, the first predetermined amount being greater than the second predetermined amount.

References Cited in the file of this patent
UNITED STATES PATENTS

| 2,739,302 | Timbie | Mar. 10, 1956 |
| 2,755,456 | Bursack | July 17, 1956 |